May 6, 1958 L. L. LAURENCE ET AL 2,833,369
APPARATUS FOR SEPARATING FLUIDS
Filed June 22, 1955 2 Sheets-Sheet 1

LAWTON L. LAURENCE,
ROBERT E. McMINN AND
CHESTER A. SIVER
INVENTORS

LAWTON L. LAURENCE,
ROBERT E. McMINN AND
CHESTER A. SIVER
INVENTORS

2,833,369

APPARATUS FOR SEPARATING FLUIDS

Lawton L. Laurence and Robert E. McMinn, Oklahoma City, Okla., and Chester A. Siver, Mission, Kans., assignors to Black, Sivalls & Bryson, Inc., Kansas City, Mo., a corporation of Delaware Application June 22, 1955, Serial No. 517,194

3 Claims. (Cl. 183—2.7)

The present invention relates to fluid separators. More particularly, the present invention relates to a method and an apparatus for separating the components of a hydrocarbon oil and gas wellstream.

The separation of the liquid component from the gas component of a fluid stream may be accomplished by settling in a large chamber with the liquid component collecting in the bottom of the chamber. This is a gravity or settling type of separation. In continuous flow systems this type of separation requires tremendous volumes which are generally economically unfeasible. Therefore, as an aid to separation it is a common practice to utilize some of the pressure of the stream to obtain a velocity and then direct the stream along a curved path (usually the interior of the shell of a cylindrical vessel) to force the liquid outward by centrifugal force while the gas is displaced toward the center of the curved path. Another aid to separation is the reversal of the flow path without the high velocities of centrifugal separation, e. g., requiring the flow to turn and proceed in a substanially opposite direction, whereby the inertia of the moving liquid causes the liquid to continue in the same direction of flow. Another aid to separation is the provision of surfaces on which the separated liquid can settle and drain to a liquid collecting chamber. These surfaces are most effective when they are in the way of the liquid flow path but out of the flow path of the gaseous component whereby re-entrainment may be prevented.

The design of vessels to perform the separation of liquids from gases of a fluid stream is dominated by a compromise of either economics or quality of separation or both. Since the spherical shaped vessel is the most economical shape, i. e., the least material required for a given volume, it should be favored only if it can provide a high quality of separation.

Therefore, the primary object of the present invention is to provide a method and an apparatus for separating a liquid component from a gas component of a fluid stream utilizing centrifugal force, the force of gravity and the force of inertia.

Further objects of the present invention are to provide a method and an apparatus for separating a liquid component from a gas component of a fluid stream wherein surfaces are provided on which the liquid which is separated by gravity, inertia and centrifugal force may settle; to provide a method and an apparatus for the separation of the components of a hydrocarbon wellstream utilizing a spherical configuration vessel; to provide a method and an apparatus in which the separated gas is used to insulate and warm the separated liquids to prevent freezing; and to provide an oil and gas separator having a flow path entering centrally between two dished members and flowing therebetween to effect coalescence and settling of the oil on the surfaces of the dished members.

In accomplishing these and other objects of the present invention, we have provided improved details of structure, the preferred form of which is illustrated in the accompanying drawings wherein.

Figure 1:
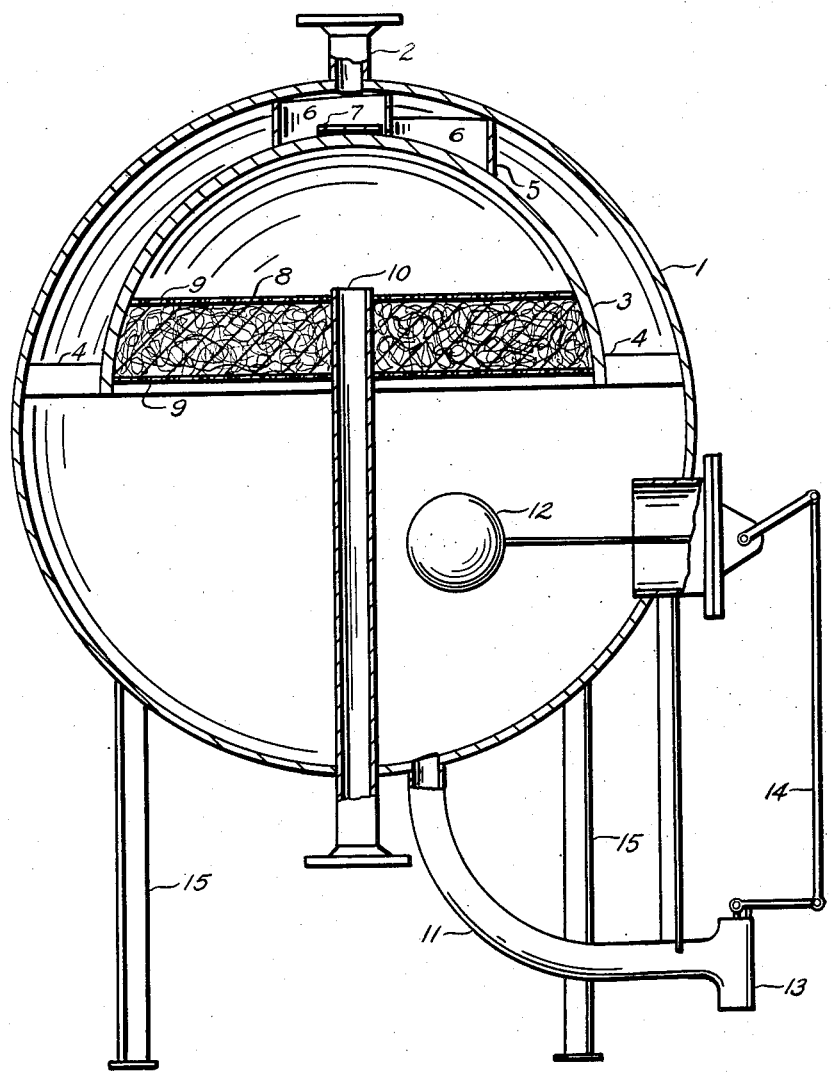
Fig. 1 is a sectional view of a fluid separator constructed in accordance with the present invention.

Referring more in detail to the drawings:

The numeral 1 in Fig. 1 generally designates the outer spherical shell of a spherical separator embodying the fundamentals of the present invention and adapted to separate the liquid from the gas of a fluid stream. The inlet duct 2 passes into the interior of the outer shell 1, opening directly above the upper central portion of the dished member 3. The dished member 3 is spaced from the inner surface of the shell 1 and supported in this spaced relationship by brackets 4 and the spiral bar 5. The brackets 4 are welded or otherwise suitably secured to both the dished member 3 and the shell 1 and the bars 5 are secured in position surrounding the inlet duct opening to provide a passageway 6 of increasing area for the fluid flow. A wear plate 7 is secured to the portion of the dished member 3 directly beneath the inlet duct 2 by welding or other suitable means.

A mist extraction element 8 is contained between two support grids 9 within the concave portion of dished member 3. These support grids 9 are secured to the inner wall of the dished member 3 and are made to have sufficient opening so as not to cause a restriction to the flow of gas therethrough. The gas outlet duct 10 extends from a position within the concave portion of the dished member 3 and above the mist extraction element 8 downwardly through the shell 1 as shown in Fig. 1.

The liquid collecting in the lower portion of the shell 1 is dumped from the separator through the liquid outlet 11 under the control of the float 12 which operates a liquid dump valve 13 either through a mechanical linkage 14 as shown or other suitable means. The separator is shown supported on legs 15 which may be welded or otherwise suitably secured to the shell 1.

Figure 2:
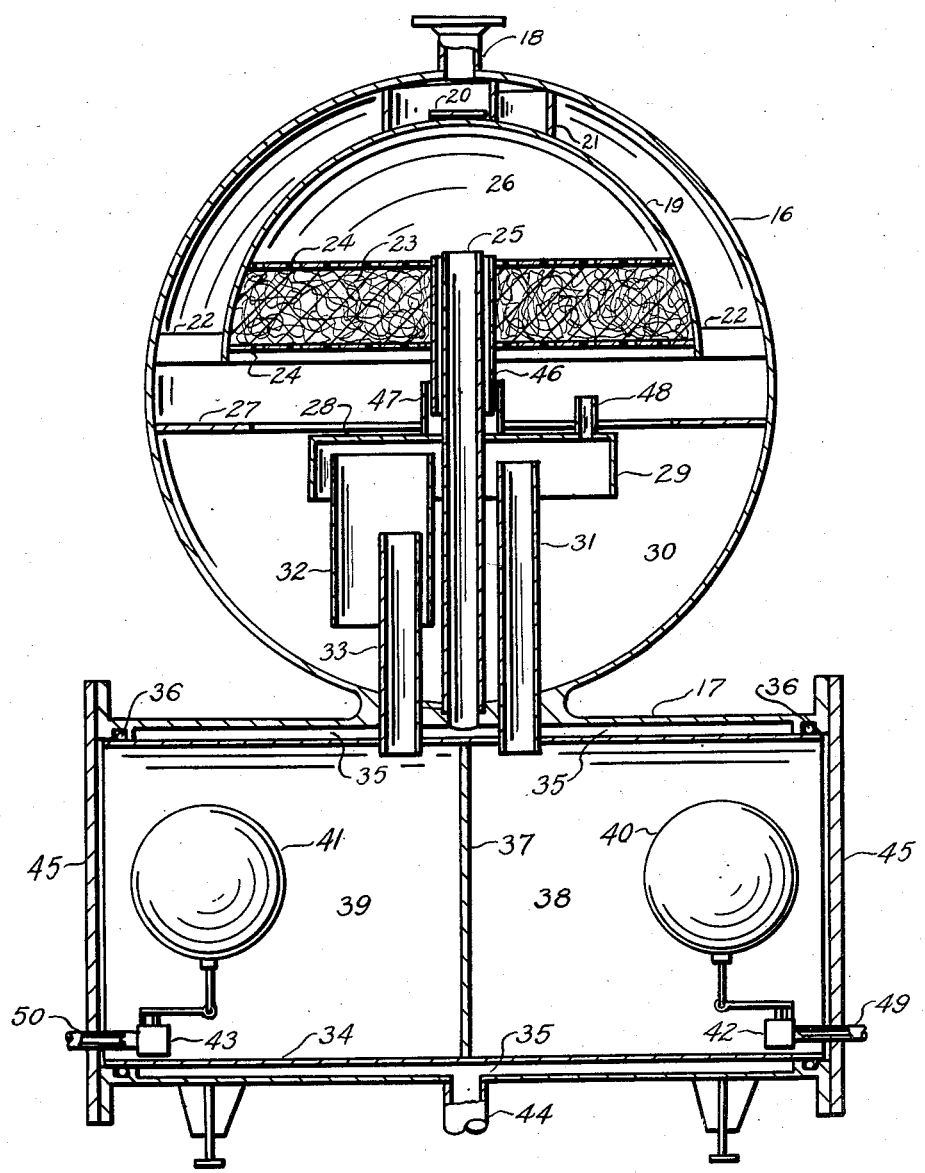
Fig. 2 is a sectional view of an oil and gas separator adapted to separate the components (oil, gas and water) of a hydrocarbon wellstream in accordance with the present invention.

The separator illustrated in Fig. 2 is composed of upper spherical shell 16 and a lower horizontal cylindrical shell 17. As in the separator shown in Fig. 1 the inlet duct 18 enters the spherical shell 17 through its uppermost portion and opens above the dished member 19 onto the wear plate 20. A spiral bar 21 surrounding the opening of the inlet duct 18 spaces the dished member 19 from the shell 16 and the brackets 22 secure the dished member 19 in such position. The mist extraction element 23 is contained within the concave side of the dished member 19 and between support grids 24. The gas outlet duct 25 extends from a position within the concave side of the dished member 19 and within the space 26 above the mist extraction element 23 and upper support grid 24 through the lower portion of the spherical shell 16 and into the cylindrical shell 17.

An annular splash plate 27 is secured to the shell 16 below the depending edge of the dished member 19. A hood 28 having depending flange 29 surrounds the gas outlet duct 25 and is spaced from the inner periphery of the plate 27 to provide a passageway for the separated liquid into the stilling chamber 30. An overflow member 31 is positioned within the hood flange 29 on one side of the gas outlet duct 25 and extends downwardly through the shell 16. A tubular member 32 is positioned within the hood flange 29 on the other side of the gas outlet duct 25 from the member 31. Member 32 extends to a level above that of the upper edge of the overflow member 31 and terminates short of the lower portion of the spherical shell 16. Another overflow member 33 is positioned within the tubular member 32 having its upper edge at a level below the level of the overflow member 31 and above the lower extremity of the flange 29. Overflow member 33 extends downwardly through the shell 16 into shell 17.

Shell 17 is secured to the spherical shell 16 or made integral therewith so that the two shells will be joined at the lower portion of the spherical shell 16 and at the upper central portion of the cylindrical member 17. A tubular member 34 is contained within the cylindrical member 17 and is spaced from the inner walls of the shell 17 to provide a passageway 35 surrounding the member 34. O-rings 36 or other suitable sealing means are used to provide a seal between the inner portion of the tubular member 34 and the passageway 35. A partition 37 is positioned within the tubular member 34 to form two liquid collecting chambers 38 and 39.

The gas outlet duct 25 passes through the spherical shell 16 and terminates in the passageway 35. The overflow member 31 extends through the spherical shell 16 and the tubular member 34 and terminates in the chamber 38. The overflow member 33 extends through the spherical shell 16 and the tubular member 34 and terminates in the chamber 39. The floats 40 and 41 operate valves 42 and 43 to control the level of the liquid in the chambers 38 and 39. Gas is discharged from the passageway 35 through the connection 44 under the control of suitable valving (not shown). The ends of the cylindrical shell 17 are closed with blind flanges 45 or other suitable means.

A tubular member 46 surrounds the gas outlet duct 25 and extends from a position within the space 26 terminating in close spaced relationship with the upper surface of the hood 28. A trap member 47 is secured to the top portion of the hood 28 and extends upwardly surrounding the lower portion of the member 46 and terminates short of the lower support grid 24, to form a by-pass trap. The pressure equalizing duct 48 secured to the hood 28 extends upwardly through the hood 28 to a position below the lower support grid 24.

In operation the device illustrated in Fig. 1 separates the liquid and gas components of a fluid stream as follows:

The incoming stream enters through the inlet duct 2, discharges onto the wear plate 7 and flows through the spiral passageway 6. It should be noted that the area of flow is constantly increasing as the flow progresses toward the lower depending edges of the dished member 3. Also, if larger flow areas are required for a given application, then the use of a smaller diameter dished member 3 or possibly the use of a dished member 3 of a different shape may be desirable. The dished member 3 will always be positioned under the inlet entrance and spaced from the shell 1 sufficiently to provide the desired initial flow area.

The spiral passageway 6 causes the flow to whirl, providing some centrifugal separation of the liquid from gas. This liquid will collect on the inner surface of the shell 1 and on the spiral bar 5. Gravity will cause drops of liquid to settle on the outer or convex surface of the dished member 3 and subsequently fall into the lower portion of the vessel to collect with the liquid collecting off the inner surface of the shell. Also, any droplets of liquid still in the fluid flow in passing the lower edges of the dished member 3 will tend, due to inertia to continue in a downward direction and the gas will flow upwardly through the mist extraction element 8 and out the gas outlet duct 10.

The separated liquid collects in the lower portion of the shell 1 and is discharged from the vessel through the liquid outlet 11 and the dump valve 13 which is under the control of the float 12. It should be noted that the gas outlet duct 10 passes through the lower portion of the shell 1 and would therefore pass through the separated liquids causing these liquids to be warmed and preventing freezing during cold weather. Even though the fluid stream may be warm upon entering the separator, during the cold weather the liquids will collect and remain for a period of time in the separator and will freeze if the separated gas or some other source of heat does not supply the requisite warming.

The three phase oil and gas separator shown in Fig. 2 operates in a manner similar to the operation of the two phase separator shown in Fig. 1. The wellstream enters the top of the spherical shell 16 and is discharged onto the wear plate 20 on the dished member 19. The flow is through the path defined by the spiral bar 21 between the outer surface of the dished member 19 and the inner surface of the spherical shell 16. The coalescence and separation of liquid droplets is accomplished in the same manner and by the utilization of the same forces as the separation described in the discussion of the operation of the separator of Fig. 1. The separated gas passes through the mist extraction element 23, the duct 25, passageway 35 and out through the gas outlet connection 44. Liquid, both oil and water, coalesce into large drops and settle on the inner surface of the shell 16 and the outer surface of the dished member 19. The liquid drains onto the splash plate 27 and into the lower portion of the shell 16 to collect in the stilling chamber 30. Water, being heavier, descends and oil, being lighter, rises to the top of the collected liquids in the stilling chamber 30. The separated oil passes under the lower edge of the depending flange 29 of the hood 28, over the upper edge of the overflow member 31, through the member 31 into the chamber 38. The collected oil is dumped from the chamber 38 through the oil outlet 49 under the control of the float operated valve 42.

The water separated in the stilling chamber 30 passes under the lower edge of the tubular member 32, over the upper edge of the overflow member 33, through the member 33 and into the chamber 39. The collected water is dumped from the chamber 39 through the water outlet 50 under the control of the float operated valve 43.

As a precautionary measure the trap member 47 co-operates with the tubular member 46 to provide a gas by-pass around the mist extraction element 23 in case excessive pressure drop occurs across such element 23. During normal operation the member 47 will have sufficiently high column of liquid to prevent the gas from flowing through the by-pass instead of through the mist extraction element 23.

The insulation and warming of the separated liquids in the chambers 38 and 39 by the gas in passageway 35 should be noted. Also, gas passing through the duct 25 will warm the liquids collecting in the stilling chamber 30 and prevent freezing of the water due to exterior cold conditions of weather.

Thus it may be seen from the foregoing specification that we have provided an improved method and apparatus relating to the separation of the components of a fluid stream and one which is adaptable but not limited to the more economical spherical configuration. Also, we have provided a method of and apparatus for separating gas and liquid utilizing the forces of gravity and inertia and centrifugal force to aid the separation and have provided a surface area for the settling of separated liquid.

What we claim and desire to secure by Letters Patent is:

1. An oil and gas separator comprising, a spherical shell, a horizontal cylindrical shell, said spherical shell positioned upon the upper central portion of said cylindrical shell, an oil and gas inlet through the upper portion of said spherical shell, a concavo-convex member positioned within said spherical shell with the convex side of said member facing upwardly and in close spaced relationship with said inlet, means closing each end of said cylindrical shell, at least one liquid duct extending from said spherical shell into the interior of said cylindrical shell, a gas outlet from said spherical shell, said gas outlet having an inlet end positioned within the concave portion of said concavo-convex member, means in said spherical shell for decanting two immiscible liquids, a chamber surrounding said cylindrical shell, means connecting said gas outlet duct into said chamber and a gas discharge duct extending from said chamber.

2. An oil and gas separator comprising, a spherical shell, an inlet into the uppermost portion of said spherical shell, a substantially hemispherical concavo-convex member within said shell, said member being positioned within the upper portion of said shell and spaced therefrom whereby the central portion of its convex side faces upwardly and is in close spaced relationship to the opening of said inlet through said shell and the edges of said member are positioned to be substantially horizontal, a liquid outlet from said shell and a gas outlet duct from said shell, said gas outlet duct having an inlet within said shell and positioned within the spaced encompassed by the concave side of said member.

3. Invention according to claim 2 including, a mist extraction element positioned in the space encompassed by the concave side of said member and surrounding said gas outlet duct.

References Cited in the file of this patent

UNITED STATES PATENTS

| | | |
|---|---|---|
| 2,288,245 | Kopp | June 30, 1942 |
| 2,619,187 | Hayes et al. | Nov. 25, 1952 |
| 2,678,699 | Fowler | May 18, 1954 |
| 2,710,071 | Kinser et al. | June 7, 1955 |